United States Patent [19]

Frisby et al.

[11] Patent Number: 4,717,421
[45] Date of Patent: Jan. 5, 1988

[54] SOLID TIN-PALLADIUM CATALYST FOR ELECTROLESS DEPOSITION INCORPORATING STANNOUS SALTS OF ORGANIC ACIDS

[75] Inventors: C. Richard Frisby, Strongsville; Billie I. Page, Cleveland Heights, both of Ohio

[73] Assignee: McGean-Rohco, Inc., Cleveland, Ohio

[21] Appl. No.: 857,034

[22] Filed: Apr. 28, 1986

[51] Int. Cl.$^4$ .................. B01J 27/06; B01J 31/30; C23C 3/02
[52] U.S. Cl. .................. 106/1.11; 427/304; 427/306
[58] Field of Search .............. 106/1.11; 427/304, 306

[56] References Cited

U.S. PATENT DOCUMENTS

| | | | |
|---|---|---|---|
| 3,011,920 | 12/1961 | Shipley | 117/213 |
| 3,532,518 | 10/1970 | D'Ottavio | 106/1 |
| 3,607,352 | 9/1971 | Fadgen et al. | 117/47 |
| 3,672,923 | 6/1972 | Zeblisky | 106/286 |
| 3,672,938 | 6/1972 | Zeblisky | 427/306 |
| 3,682,671 | 8/1972 | Zeblisky | 106/286 |
| 3,904,792 | 9/1975 | Gulla | 106/1.11 |
| 4,020,009 | 4/1977 | Gulla | 106/1.11 |
| 4,061,588 | 12/1977 | Gulla | 106/1.11 |
| 4,120,822 | 10/1978 | Jameson | 106/1.11 |
| 4,180,480 | 12/1979 | Jameson | 106/1.11 |
| 4,182,784 | 1/1980 | Krulik | 106/1.11 |
| 4,212,768 | 7/1980 | Jameson | 106/1.11 |

FOREIGN PATENT DOCUMENTS

| | | | |
|---|---|---|---|
| 2742777 | 3/1978 | Fed. Rep. of Germany | 106/1.11 |
| 2756333 | 6/1979 | Fed. Rep. of Germany | 106/1.11 |

OTHER PUBLICATIONS

Nathan Feldstein, "Reliability in Printed Circuitry Metalization-A Case for Improved Catalyzing Systems", Plating, Jun. 1973, pp. 611–616.

*Primary Examiner*—Norman Morgenstern
*Assistant Examiner*—Margaret Burke
*Attorney, Agent, or Firm*—Renner, Otto, Boisselle & Lyon

[57] ABSTRACT

An improved method of producing a tin/palladium catalyst for use in electroless plating baths is disclosed. The method comprises the steps:
(a) preparing a mixture of stannous halide, an alkali metal halide and water,
(b) reacting said mixture with a palladium halide salt at an elevated temperature,
(c) adding a stannous salt of an organic carboxylic acid to the reaction mixture obtained in step (b), and
(d) continuing the heating of the reaction mixture to complete the reaction.

The catalysts so produced exhibit improved activity and resist decomposition.

23 Claims, No Drawings

SOLID TIN-PALLADIUM CATALYST FOR ELECTROLESS DEPOSITION INCORPORATING STANNOUS SALTS OF ORGANIC ACIDS

FIELD OF THE INVENTION

Method for the production of improved tin-palladium catalysts useful in electroless deposition processes.

DESCRIPTION OF THE PRIOR ART

Electroless metal deposition refers to the chemical deposition of a metal on a conductive, non-conductive, or semi-conductive substrate in the absence of an external electric source.

Electroless deposition is used for many purposes, for example, in the manufacture of printed circuit boards where, in one method, a metal, typically copper, is deposited on a dielectric substrate either as a uniform surface coating or in a predetermined pattern. This initial electroless deposit is usually thin and may be further built up by electroplating or may be deposited directly to full thickness.

The substrate over which an electroless metal deposit is formed is most often a plastic panel which may have a metal foil such as copper laminated to one or both of its surfaces, for example, with adhesive, to form a metal clad substrate. Where both surfaces of the substrate are to be used, connections are typically provided therebetween by means of holes through the panel at appropriate locations, the walls of these holes being made conductive with the electroless coating.

The electroless deposition of a metal on either a metallic or non-metallic substrate usually requires pretreatment or sensitization of the substrate to render it catalytic to the reception of such a deposit. Various methods have evolved over the years employing particular sensitizing compositions.

One class of these sensitizing catalysts uses tin and palladium in combination. Several U.S. patents have been directed to improvements in the production, content and form of these tin/palladium sensitizing compositions.

U.S. Pat. No. 3,011,920 (Shipley) describes a process in which a colloidal solution is prepared by mixing an aqueous acid solution of palladium chloride with an aqueous acid solution of stannous chloride and optionally including a tin salt such as sodium stannate. This is purported to produce a lyophilic colloid which, after acceleration with an acid or alkaline solution such as hydrochloric acid or sodium hydroxide provides a sensitizing layer for the subsequent electroless plating of a metal such as copper.

U.S. Pat. No. 3,672,923 (Zeblisky) describes solid compositions dilutable to optically clear sensitizing solutions for electroless plating. These solutions are prepared by combining a dilute solution of a noble metal salt in hydrochloric acid with a hydrochloric acid solution of a stannous salt such as stannous chloride dihydrate. The mixture is heated and then subsequently cooled and evaporated to dryness under vacuum to constant weight. The solid composition, as described, may then be reconstituted in hydrochloric acid to provide an active sensitizing solution.

U.S. Pat. No. 3,607,352 (Fadgen et al) describes the use of tartaric acid to improve the stability of a tin sensitizer. The theory is advanced that tartaric acid, which is one of the preferred hydroxy substituted acids of the present invention, inhibits tin oxychloride formation.

U.S. Pat. No. 3,904,792 (Gulla et al.) discloses the advantages of using excess halide ions, in concentrations of at least 0.2 moles/liter in excess of the other chloride ion components, such as furnished by stannous and palladium chloride solutions.

Nathan Feldstein, "Reliability in Printed Circuitry Metalization—A case for Improved Catalyzing Systems", *Plating*, June 1973. In the Feldstein article it is recognized that the inclusion of halide salts improves the stability of catalytic sensitizer solutions.

U.S. Pat. No. 4,020,009 (Gulla) provides a method of producing improved dry tin/palladium catalyst compositions which represented an improvement over the colloidal suspensions of U.S. Pat. No. 3,011,920.

U.S. Pat. No. 4,120,822 (Jameson et al) provides improved tin/palladium catalyst compositions prepared without the use of acid by reacting an aqueous halide solution of a palladium salt with a tin salt (typically chloride). The described method comprises the steps of:

(1) melting a predetermined quantity of a hydrated stannous chloride composition;

(2) adding an aqueous solution of palladium chloride and a water soluble halide salt, other than said stannous chloride composition and said palladium chloride, selected from the group consisting of bromide and chloride to the molten hydrated stannous chloride;

(3) adding anhydrous stannous chloride to the mixture in a quantity sufficient to convert, at a minimum, all but 20% of the water in said aqueous solution to water of hydration association with said anhydrous stannous chloride;

(4) reacting the mixture at a temperature between 35° and 140° C.; and (5) cooling the product to yield a dry, friable material or a liquid or a semisolid concentrate.

U.S. Pat. No. 4,182,784 (Krulik) describes tin-palladium catalysts which are stabilized through the use of hydroxy-substituted organic acids to prepare the catalysts from non-halide salts. The method involves placing a stannous salt in an aqueous solution containing a hydroxy-substituted organic acid and reacting the resultant mixture with a palladium salt. The method is designed to eliminate the use of halide salts which form noxious fumes when used in acidic plating baths.

In the past, stabilized tin-palladium baths had been prepared by using either the chloride salt or bromide salt of palladium and/or tin; the concentrate then being dissolved in hydrochloric acid to produce the working bath. Other salts, such as palladium sulfate and tin sulfate have been used, but the presence of HCl has always furnished a large amount of $Cl^-$ anions regardless of the salt anion chosen.

U.S. Pat. No. 4,120,822 (Jameson et al.) established that tin-palladium catalysts could be prepared without the use of acid by reacting an aqueous halide solution of a palladium salt with a compatible tin salt.

U.S. Pat. No. 4,182,784 (Krulik) represented a departure from the prior art with the discovery that the $Cl^-$ anion could be substantially, or even completely, replaced by the conjugate anion of organic acids in the catalyst production method. This patent teaches the minimization, if not elimination, of halide ions from the catalyst production method to avoid the toxicity problem attendant to making acidic plating baths containing halide anions. The catalyst of the Krulik patent is a liquid.

The contents of U.S. Pat. Nos. 4,120,822 and 4,182,784 are hereby incorporated by reference.

SUMMARY OF THE INVENTION

The present invention represents an improved method of incorporating organic acid into the catalyst structure yielding a catalyst whose activity is markedly improved over the prior art. This is accomplished by preparing a mixture of stannous halide, an alkali metal halide and water, reacting this mixture with a palladium halide salt at an elevated temperature, adding a stannous salt of an organic carboxylic acid to the reaction mixture and continuing the heating of the mixture until the reaction is complete.

The resulting catalyst is a solid which facilitates easier and cleaner handling and avoids toxicity problems attendant to handling toxic liquids. Ease in handling is especially apparent if one considers the difficulty of replenishing an existing working bath. If the replenisher solution is added in relatively dilute liquid form, it is normal practice to remove an equivalent volume of the exhausted bath to make room for the addition. If the materials can be added in the highly concentrated solid form, it is only necessary to calculate the amount of composition needed to bring the bath up to working strength and then add the solid catalyst. The negligible volume of the solid catalyst, compared to a liquid concentrate, has little, if any effect on the volume of solution in the catalyst tank. Moreover, it is obvious that shipping and storage of a dry material would be more economical than for a liquid concentrate; and the fact that acid solutions are not involved reduces the safety hazards involved in handling the catalyst.

DETAILED DESCRIPTION

The method of the invention comprises generally the steps of:

(a) preparing a mixture comprising stannous halide, an alkali metal halide and water,
(b) reacting said mixture with a palladium halide salt at an elevated temperature,
(c) adding a stannous salt of an organic carboxylic acid to the reaction mixture obtained in step (b), and
(d) continuing the heating of the reaction mixture to complete the reaction.

The stannous halide used in step (a) above may be any of the stannous halide salts in their various hydrated and non-hydrated forms or mixtures thereof. Examples of stannous halides include: $SnBr_2$, $SnCl_2$ and $SnCl_2.2H_2O$. The more water-soluble salts are preferred. Of the anions, chloride is preferred and, of these compounds, $SnCl_2$ is preferred.

The alkali metal halide used in step (a) above may be any alkali metal halide or mixtures thereof. Examples include: NaCl, KCl, KBr, NaBr, LiBr and RbCl.

The preferred of the alkali metal halides are the potassium salts, particularly potassium chloride.

The water used in step (a) is preferably deionized water which helps to prevent contamination and spurious reactions in the mixture. However, all or part of this water may be omitted if hydrated salts are employed.

In step (b), at least one palladium halide salt is added to the mixture. The palladium halide salt(s) are formed by reacting at least one palladium halide with at least one alkali metal halide. Examples of palladium halides which can be used to form the palladium halide salt are: $PdBr_2$, $PdF_2$, $PdCl_2$ and $PdCl_2.2H_2O$. Of these $PdCl_2$ is preferred. Examples of alkali metal halides which may be so used include NaCl, KCl, NaBr, KBr, and LiBr and RbCl. The preferred alkali metal halides are the potassium metal salts and, of these, potassium chloride is preferred.

The amounts of the palladium halide and alkali metal halide added in step (b) should preferably be chosen to yield a molar ratio of palladium to alkali metal of at least about 1:2.

The mixture resulting from step (b) is maintained at an elevated temperature, preferably in the range of from about 70° to about 110° C. A more preferred temperature range is from about 85° to about 95° C. Heating is continued for an effective time to allow the palladium and tin salts to react. This is generally in the range of from about one-half hour to about three hours or more. The reaction is normally complete after one hour when maintained in the 85°–95° C. temperature range.

After step (b) is completed, a stannous salt of an organic carboxylic acid is added to the reaction mixture. Mixtures of stannous salts can be added. A wide variety of Sn(II) carboxylates may be used including salts of mono- and polycarboxylic acids. These carboxylic acids need not be of any particular size, however lower carboxylic acids, i.e. from 2 to 12 carbons, are preferred. Examples of carboxylic acids from which suitable stannous carboxylate salts are derived include:

tartaric acid (2,3-dihydroxy butanedioic acid)
citric acid (2-hydroxy-1,2,3-propanetricarboxylic acid)
oxalic acid (ethanedioic acid)
succinic acid (butanedioic acid)
glycolic acid
acetic acid
lactic acid (2-hydroxy-propanoic acid)
maleic acid (cis-butanedioic acid)
butanoic acid
2-hydroxy-butanoic acid
4-hydroxy-butanoic acid
3-hydroxy-propanoic acid
2-hydroxy-2-methyl-propanoic acid
pentanoic acid
2-hydroxy-pentanoic acid
4-hydroxy-pentanoic acid
2-hydroxy-4-methyl-pentanoic acid.

The preferred acids for use as stannous salts in the present invention are oxalic acid and the mono- and polyhydroxy-substituted acids, preferably tartaric acid.

The stannous carboxylates used in the method of the invention may be obtained from commercial sources or may be produced by known methods of reacting at least one stannous cation source with at least one carboxylic acid or salt of said acid. Examples of suitable stannous cation sources include SnO, $SnCl_2.2H_2O$, $SnSO_4$, $Sn(NO_3)_2$ and $SnBr_2$. The preferred stannous cation source is stannous sulfate.

The stannous carboxylate forming reaction is carried out by reacting at least one stannous cation source with at least one carboxylic acid or salt of said acid.

The temperature of the stannous carboxylate forming reaction is preferably maintained in the range of from about 15° C. to about 110° C. and more preferably in the range of from about 20° C. to 30° C. The reaction time is generally in the range of from about one-half hour to about three hours, although most of the reaction is normally complete after one hour at a temperature within the 20°–30° C. range.

The amounts of the ingredients of the mixture achieved upon performing step (c) should be measured to yield a stannous halide:palladium halide molar ratio of at least about 2:1.

The molar ratio of the stannous carboxylate salt ingredient to that of the palladium halide ingredient should be in the range of from about 10:1 to about 50:1.

After the addition of the stannous carboxylate to the reaction mixture in step (c), the temperature of the reaction mixture should be in the range of from about 70° to about 110° C. These elevated temperatures are maintained until the reaction is complete. A more preferred range is from about 85° to about 95° C. The reaction generally takes about one hour at a temperature in the 85°–95° C. range.

The reaction mixture is finally cooled, and the catalytically active product is recovered. The product is recovered by pouring the mixture into trays and allowing it to cool and dry by air exposure. The dry catalyst may be stored without regard to ambient temperatures or air exposure. Typically, other dry compositions, that are mainly $SnCl_2.2H_2O$, absorb oxygen forming oxychlorides of stannic tin.

The catalyst composition prepared by the method of the invention should contain a molar ratio of stannous ion to palladium ion of at least about 6:1.

In order to better understand the present invention, the following example is set forth as an illustration only.

EXAMPLE OF A PREPARATION OF A CATALYST

This exemplary procedure is carried out as a two-step process using two containers, one of approximately 10-gallon (hereinafter "container A") and the other of approximately 30-gallon (hereinafter "container B") capacities. Both containers should have means for stirring and heating their contents (i.e. a stirring apparatus capable of 300 rpm and steam heating apparatus), and container A should have means to transfer its contents quickly to container B (i.e. a hose). Container A is charged with 2.01 kilograms of deionized distilled water and heated to a temperature of about 65° C. To this are added 2.3 kilograms of potassium chloride and 2.735 kilograms of palladium chloride. The container is then covered, brought to a temperature of about 90° C., and stirred until the reaction is complete.

Container B is charged with 7.8 kilograms of deionized distilled water and 42.86 kilograms of stannous chloride. Container B is then sealed and stannous chloride dihydrate is formed by heating the contents to a temperature of about 70° C. until the contents melt. If the contents do not melt, the temperature should be slowly increased and the contents checked at about every 5° C. increase until melting occurs. The melt is then stirred for 15 minutes.

An aliquot of 6.9 kilograms of potassium chloride is then added to container B while the temperature is maintained and the stirring is continued for another 15 minutes. The temperature is then increased to about 85°–95° and maintained for about one hour.

The contents of container A are then transferred quickly to container B by means of a hose. The transfer preferably is made within a period of 40 to 50 seconds. If both A and B are at 90° C. at the time of addition, the reaction forming the catalyst generally will be indicated by an exotherm of about 5°–10° C.

Container B is then sealed and stirring and heating are maintained for 1 hour. The temperature should be kept at about 95° C.

Afterwards, 100.4 kilograms of stannous tartarate are slowly added to container B while the mixing and stirring are maintained. Container B is then resealed and a temperature of about 95° C. is maintained, with stirring for 1 hour. The temperature preferably is maintained above 85° C.

The final product is then drawn from container B and allowed to air dry for about 48 hours. Drying is facilitated by occasionally breaking the solid cake that forms to allow increased surface exposure. The dry catalyst may then be packaged and stored as desired.

The product prepared in this manner was found to be about 1.75% by weight in $PdCl_2$ and about 40% by weight in Sn(II).

The stannous tartrate used in this exmaple is prepared by reacting stannous sulfate with tartaric acid. Stannous sulfate (413.5 kilograms) and 363.66 kilograms of tartaric acid are dissolved in about 115 gallons of deionized water and mixed for one hour. Thereafter, the product is allowed to settle and the supernatant liquid is drawn off. The product is then washed on a filter with three successive 25 gallon aliquots of deionized water. The resulting filter cake is dried at 100° C.

Generally, the catalyst composition of the invention can be used for electroless plating of non-conductive materials with any metal, primarily nickel or copper, according to practice known in the art.

The catalyst solution is prepared by dissolving the catalyst composition in a solution of at least one mineral acid, preferably HCl. The acid concentration is in the range of from about $\frac{1}{2}$N to about 4N, preferably from about 1N to about 3N.

The concentration of the catalyst composition in the bath is at least about 0.15 millimoles/L, measured as $PdX_2$, where X is the halide associated with palladium in the halide salt.

The following specific examples illustrate the use of the catalysts of the invention and demonstrate some of the improved results achieved as compared to catalysts of the prior art.

The catalyst of the current invention, hereinafter called DriCat-3X, and the catalytic compositions as taught by U.S. Pat. No. 3,011,920 (Example 2), U.S. Pat. No. 3,532,518 (Example 1), U.S. Pat. No. 3,672,938 (Example 1) and U.S. Pat. No. 4,120,822 (Example II), all yield excellent electroless nickel coverage when employed in working baths at catalyst equivalent concentrations (CEC) of 200 mg/L $PdCl_2$. In order to demonstrate the superior catalytic activity of DriCat-3X over the catalytic compositions of the prior art, working baths of the above catalysts were prepared at low concentrations and employed in an electroless nickel preplate cycle.

Standard plateable grade ABS test plaques were sequenced through a preplate cycle consisting of the following steps:
1. etching the surface of a standard test plaque of ABS resin in a chromic acid-sulfuric acid etch bath;
2. neutralizing any Cr(VI) remaining on the surface;
3. immersion in a low concentration bath of either DriCat-3X or DriCat-3 to activate/sensitize the surface;
4. accelerating the activated/sensitized surface with an acid dip;

5. immersion in an electroless nickel bath containing nickel ions, hypophosphite, stabilizers and buffering agents.

Intervening deionized water rinses were employed between steps 1 and 2, 2 and 3, and 4 and 5. The etching step was performed at an elevated temperature, about 75°–80° C., while all other steps were completed at room temperature.

The following steps were taken to process the test plaques:

| STEP | TYPE | TEMP. | TIME | AGITATION |
|---|---|---|---|---|
| 1. Etch | chromic-sulfuric acid bath | 75–80° C. | 12 min. | Moderate |
| 2. Rinse | Deionized H$_2$O | Room | — | Flowing |
| 3. Neutralize | D-400 | Room | 1 min. | Rapid |
| 4. Rinse | DI H$_2$O | Room | — | Flowing |
| 5. Activate | DriCat-3X or other | Room | 3 min. | Manual |
| 6. Accelerate | 1:1 HCl | Room | 2 min. | Still |
| 7. Rinse | Deionized H$_2$O | Room | — | Flowing |
| 8. Plate | Electroless Nickel Bath | Room | 3 min. | Slow, gentle |

Manual agitation refers to a transverse movement of the panels through the catalyst bath. Agitation is believed necessary for the more dilute catalyst solutions that can be employed in the method of the invention to aid transport of the active species to the surface of the material to be treated.

The following examples demonstrate the method of the invention and results are compared to prior art methods. For purposes of qualitative comparison, it should be noted that coverage values less than 100% do not yield commercially valuable products.

EXAMPLE I

Working baths containing a CEC of 50 mg/l PdCl$_2$ in 3M hydrochloric acid were prepared for DriCat-3X and the prior art compositions identified above. Standard plateable grade ABS panels were processed through the preplate cycle employing the individual baths at the "Activate" step. The results obtained are given below.

| CATALYST | COVERAGE |
|---|---|
| DriCat-3X | 100% |
| U.S. Pat. No. 3,011,920 | 98% |
| U.S. Pat. No. 3,532,518 | 100% |
| U.S. Pat. No. 3,672,938 | 100% |
| U.S. Pat. No. 4,120,822 | 100% |

EXAMPLE II

Working baths containing a CEC of 25 mg/L PdCl$_2$ in 3M HCl were prepared from DriCat-3X and the catalytic composition of U.S. Pat. No. 3,011,920. Two standard plateable grade ABS test plaques were simultaneously processed through the preplate cycle. The panels were separated at the "Activate" step for immersion in the individual baths.

The panel processed through the DriCat-3X bath yielded 100% electroless nickel coverage, while the concurrent panel of U.S. Pat. No. 3,011,920 promoted only 94% coverage.

EXAMPLE III

Working baths having a CEC of 25 mg/L PdCl$_2$ in 3M HCl were prepared from DriCat-3X and the catalytic composition of U.S. Pat. No. 3,532,518. Two standard plateable grade ABS test plaques were simultaneously processed through the preplate cycle employing these baths as described in Example II. While DriCat-3X promoted 100% coverage, the catalyst of U.S. Pat. No. 3,532,518 was only 81% effective.

EXAMPLE IV

Working baths having a CEC of 25 mg/L PdCl$_2$ in 3M HCl were prepared from DriCat-3X and the catalytic composition of U.S. Pat. No. 3,672,938. Two standard plateable grade ABS test plaques were simultaneously processed through the preplate cycle employing these baths as described in Example II. While DriCat-3X promoted 100% coverage, the catalyst of U.S. Pat. No. 3,672,938 was only 95% effective.

EXAMPLE V

Working baths having a CEC of 25 mg/L PdCl$_2$ in 3M HCl were prepared from DriCat-3X and the catalytic composition of U.S. Pat. No. 4,120,822. Two standard plateable grade ABS test plaques were simultaneously processed through the preplate cycle employing these baths as described in Example II. While DriCat-3X promoted 100% coverage, the catalyst of U.S. Pat. No. 4,120,822 was only 95% effective.

EXAMPLE VI

Examples II through V were repeated using a residence time of 30 seconds in the electroless nickel bath at the "Plate" step. Again, each catalytic composition of the prior art was processed simultaneously with DriCat-3X as described in Example II. Working baths of 3M HCl containing a CEC of 25 mg/L PdCl$_2$ were employed.

Although no catalytic composition promoted full electroless nickel coverage, the number and distribution of the sites where electroless nickel deposition had begun was far greater for the DriCat-3X bath than any bath prepared from the compositions of the prior art.

It should be noted that Examples II through V were performed in triplicate for each identified catalytic composition. DriCat-3X promoted 100% nickel coverage for every single run, while the stated values for the prior art compositions are the best obtained.

RESULTS

Although we do not wish to be limited by theory, we believe the superior activity of DriCat-3X is the result of a modification of the reaction media by the stannous carboxylate. This modification controls the form and/or proportion of the active specie(s) to yield the best possible product. Moreover, the dry catalyst is resistant to atmospheric oxidation and thermal degradation. It should be stressed that these aforementioned properties are only obtained from the stannous carboxylate salt and preferably from stannous tartrate.

The validity of the final statement above was tested. A catalytic composition was prepared whereby tartaric acid was substituted for stannous tartrate. This composition was not active when employed in a 3M HCl working bath at a CEC of 50 mg/l PdCl$_2$. Similarly, the addition of tartaric acid to catalytic compositions of the prior art either before or after their use in working baths at a CEC of 25 mg/L PdCl$_2$ did not improve their catalytic activity.

The improvement in physical properties obtained by employing stannous carboxylate salts, and preferably stannous tartrate may be due to the complexity of these salts and their hydrophobic behavior. Infrared data on stannous tartrate lack frequency bands that can be assigned to OH stretching. Similarly, the IR spectra of DriCat-3X also lack these bands.

Claiming no theory limitations, we suggest that this composition may be a clathrate. Analogous structural data on other tartrate salts suggest the prevalence of cage type structures. We assume that stannous tartrate may also have a cage type structure although we do not limit its effect to this structure. If this is true, then we suggest that this structure is the perfect size to enclose the active species. This would explain its physical properties.

Although the invention has been described and illustrated by reference to a particular embodiment thereof, it will be understood that in its broadest aspects the invention is not limited to such embodiment, and that variations and substitution of such equivalents may be resorted to within the scope of the appended claims.

What is claimed is:

1. A method of preparing a solid catalyst composition comprising the steps of
   (a) preparing a mixture comprising stannous halide, an alkali metal halide and water,
   (b) reacting said mixture with a palladium halide salt at an elevated temperature,
   (c) adding a stannous salt of an organic carboxylic acid to the reaction mixture obtained in step (b),
   (d) continuing the heating of the reaction mixture to complete the reaction, and
   (e) cooling the reaction mixture and recovering the solid product.

2. The method of claim 1 wherein the alkali metal halide in step (a) is potassium chloride.

3. The method of claim 1 wherein the palladium halide salt in step (b) is a chloride salt.

4. The method of claim 1 wherein the palladium halide salt comprises about one mole of palladium chloride and about two moles of a potassium halide.

5. The method of claim 1 wherein the stannous salt in step (c) is the salt of oxalic acid or a hydroxy-substituted carboxylic acid.

6. The method of claim 5 wherein the hydroxy-substituted carboxylic acid is lactic acid, citric acid or tartaric acid.

7. The method of claim 1 wherein the carboxylic acid is tartaric acid.

8. The method of claim 1 wherein the mixtures in steps (b), (c) and (d) are maintained at a temperature within the range of from about 70° to about 110° C.

9. The method of claim 1 wherein the mixtures in steps (b), (c) and (d) are maintained at a temperature of from about 85° to about 95° C.

10. The method of claim 1 wherein the molar ratio of stannous halide to palladium halide salt in step (b) is at least about 2:1.

11. The method of claim 1 wherein the molar ratio of stannous ion to palladium ion in the catalyst composition is at least about 6:1.

12. The method of claim 1 wherein the molar ratio of stannous salt to palladium halide is from about 10:1 to about 50:1.

13. A method of preparing a catalytically active solid composition useful for catalyzing a substrate for electroless plating which comprises
   (a) preparing a mixture of stannous chloride, potassium chloride and water,
   (b) heating said mixture to a temperature of about 70° to about 100° C.,
   (c) adding an aqueous solution of palladium chloride and potassium chloride to the mixture prepared in step (a) while maintaining the temperature of the mixture between about 70° to about 110° C.,
   (d) adding a stannous salt of an organic carboxylic acid to the mixture prepared in step (c) and maintaining the temperature of the mixture between about 70° and about 110° C., and
   (e) cooling the reaction mixture and recovering the solid product.

14. The method of claim 13 wherein the stannous salt in step (d) is a salt of oxalic acid or a hydroxy-substituted carboxylic acid.

15. The method of claim 13 wherein the stannous salt is a salt of a hydroxy-substituted organic carboxylic acid.

16. The method of claim 13 wherein the stannous salt added in step (d) is stannous tartrate.

17. The method of claim 13 wherein the molar ratio of stannous chloride to palladium chloride is at least about 2:1.

18. The method of claim 13 wherein the molar ratio of stannous ion to palladium ion in the catalyst composition is at least about 6:1.

19. The method of claim 13 wherein the molar ratio of stannous salt to palladium chloride is from about 10:1 to about 50:1.

20. The solid catalyst composition prepared in accordance with the method of claim 1.

21. The solid catalyst composition prepared in accordance with the method of claim 13.

22. A method of rendering the surface of a non-conductive substrate catalytic to the electroless deposition of metal which comprises contacting the surface of said substrate with an aqueous acidic solution containing a catalytically effective amount of the composition of claim 20.

23. A method of rendering the surface of a non-conductive substrate catalytic to the electroless deposition of metal which comprises contacting the surface of said substrate with an aqueous acidic solution containing a catalytically effective amount of the composition of claim 21.

* * * * *